United States Patent [19]
Fortune

[11] 3,921,249
[45] Nov. 25, 1975

[54] MINIATURE VACUUM STROKE CLEANING IMPLEMENT

[76] Inventor: William S. Fortune, 14250 Dearborn St., Panorama City, Calif. 91202

[22] Filed: June 24, 1974

[21] Appl. No.: 482,223

[52] U.S. Cl. .................. 15/341; 15/344; 228/20
[51] Int. Cl.² ..................... A47L 5/02; A47L 5/24
[58] Field of Search ................ 15/341, 344; 228/20

[56] References Cited
UNITED STATES PATENTS

| | | | |
|---|---|---|---|
| 3,263,889 | 8/1966 | Fortune | 228/20 |
| 3,604,610 | 9/1971 | Fortune | 15/344 |
| 3,818,539 | 6/1974 | Fortune | 15/341 |

*Primary Examiner*—Harvey C. Hornsby
*Assistant Examiner*—C. K. Moore
*Attorney, Agent, or Firm*—Daniel T. Anderson

[57] ABSTRACT

A hand held tool is disclosed which includes a barrel body having a tip or nozzle end and defining a cylinder along its length which holds a spring loaded piston. The piston assembly is of a plastic material and includes, in one integral, molded unit; the piston, a loading or cocking arm, a cleaning rod for ejecting foreign matter from the tip nozzle, a stop element to retain the piston assembly within the barrel body, and a trigger mechanism.

8 Claims, 4 Drawing Figures

MINIATURE VACUUM STROKE CLEANING IMPLEMENT

BACKGROUND OF INVENTION

1. Field of the Invention

The invention relates generally to removing or lifting or drawing away, by air suction technique, small quantities of particulate, liquid, or molten matter and particularly to apparatus improvements in hand held, hand operated vacuum stroke cleaning devices. The present invention finds particularly useful application in the field of soldering, desoldering, and rewiring in electronic laboratories, maintenance shops, factories, or hobbyists' benches; and although, in the cause of clarity and brevity, much of the following discussion and description of examples of the invention are directed theretoward, it is expressly to be understood that the advantages of the invention are equally well manifest in other fields wherever and whenever substances are to be removed or cleaned from an object such, for further example, in medical or dental fields, as in removal of foreign objects or unwanted substances from portions of the body including the eye, ear, nose, throat, or open wound or the like.

2. Background of the Invention

In the electrical arts as mentioned, it is often desired to desolder an electrical connection such as, for example, a wire wrapped terminal, a wire to circuit board eyelet, or the like. The removal from the connection, of the molten solder without dropping or spattering it onto other portions of the equipment is generally essential. Blowing or shaking the molten metal away is therefore not an acceptable practice; and, in combination with its high mass density, the high surface tension associated with the solder makes its removal particularly difficult. Furthermore, the problem is aggravated by the requirement that the solder be removed quickly and without application of cooling means before the mechanical connection such as a wire-wrapped terminal may be taken apart.

Various non-portable central vacuum systems and highly portable and efficient hand held vacuum stroke tools have advanced the state of the art and have solved certain aspects of the desoldering problems outlined; however, the former suffer from disadvantages of cost, complexity, lack of versatility, and non-portability while the latter suffer from some disadvantages, to a lesser extent, of cost and complexity, and, in some applications, undesirable recoil due to the flyback action of the piston cocking shaft-knob assembly during the vacuum stroke. Typically, in these prior art devices the cocking shaft which functions as a connecting rod between the piston and the cocking knob must be relatively massive to be strong enough to cock the piston against a relatively strong loading spring. Also the cocking knob is typically large and soft, and therefore massive, for comfortable repeated cocking cycles by the hand of the operator. These criteria cause the flyback mass to be relatively large compared to the thin-walled cylindrical housing body; consequently, the outer housing suffers a recoil causing a deflection of the solder inlet tip away from the location of the molten solder.

This recoil caused displacement is particularly intolerable in medical applications such as in removing foreign matter from a patient's eye.

Another disadvantage of the abrupt flyback of the shaft and knob is that the eye of the operator during the vacuum stroke is typically disposed near thereto in a position causing risk of eye injury.

It is, accordingly, an object of the present invention to provide improved vacuum stroke, cleaning apparatus which is not subject to these and other disadvantages and limitations of the prior art.

It is another object to provide such apparatus which, while providing consistently a high amplitude of impulse air flow, has no dangerously exposed flyback portion and a very low inertia associated with the flyback portions thereof causing a negligible deflection of the tool during its vacuum stroke.

It is another object to provide such apparatus which is exceedingly low in cost, is miniature and simple, and is rugged, and reliable in its structure and performance.

It is another object to provide such apparatus which may readily be molded of low cost, recyclable plastic materials.

It is another object to provide such apparatus, the outer body of which may be clear plastic to permit continuous inspection of its condition and performance.

It is another object to provide such apparatus the nozzle tip of which is automatically self-cleaning with each cocking cycle.

It is another object to provide such apparatus having readily removable and replaceable tip means particularly in medical uses for assuring the effective sterility of the implement.

SUMMARY OF THE INVENTION

Briefly, these and other objects are achieved in accordance with the structural aspects of an example of the invention in which a hand held, hand operated vacuum stroke cleaning implement is provided which includes essentially three molded plastic components: a body portion defining an internal cylinder surface and guideway structure for the piston and trigger; a tip portion defining an intake nozzle, while otherwise forming a closure for the forward end of the body portion; and a piston portion for moving axially within the cylinder surface of the body and also including an axially forwardly projecting cleaning rod element for entering and cleaning the nozzle with each use cycle. The piston portion also includes a laterally extending cocking handle, and trigger and stopping elements all of which are structurally of the character to cooperate with related elements formed in the body portion. The piston portion may, when desired, be formed to include retaining means for a separate piston ring or O-ring.

A compression, action spring, of either plastic or metal fabrication, may be contained within the cylinder body axially compressed between the nozzle or tip portion and the piston apparatus. In an alternative example, a simple tension spring or elastic band may be disposed in tension between the rear of the piston and the rear of the body portion. In operation, the spring, in the former example, is further compressed by the operator during the cocking stroke and held in an energy storing configuration by a latching mechanism element of the body and piston portions. Similarly, trigger mechanism elements are provided whereby the operator may, when desired, cause a quick release of the piston resulting in a rapid, vacuum stroke producing fly-back thereof.

Further details of these and other novel features and their operation and cooperation as well as additional objects and advantages of the invention will become apparent and be best understood from a consideration of the following description taken in connection with the accompanying drawing which is provided by way of illustrative example only.

DETAILED DESCRIPTION OF PREFERRED EMBODIMENT

Figure 1:
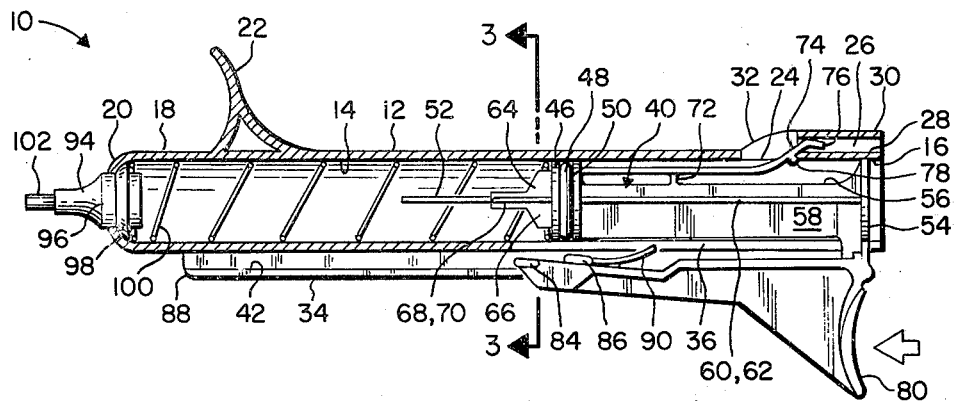
FIG. 1 is a longitudinal view, partly in section, of a miniature vacuum stroke cleaning implement constructed in accordance with the principles of the present invention, the implement being illustrated in an uncocked, or unloaded, configuration.

With specific reference now to the figures in detail, it is stressed that the particulars shown are by way of example and for purposes of illustrative discussion only and are presented in the cause of providing what is believed to be the most useful and readily understood description of the principles and structural concepts of the invention. In this regard, no attempt is made to show structural details of the apparatus in more detail than is necessary for a fundamental understanding of the invention. The description taken with the drawing will make it apparent to those skilled in the mechanical arts how the several forms of the invention may be embodied in practice. Specifically, the detailed showing is not to be taken as a limitation upon the scope of the invention which is defined by the appended claims forming, along with the drawing, a part of this specification.

Figure 4:
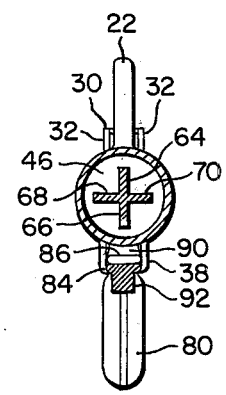
FIG. 4 is a cross-sectional view of the structure shown in FIG. 2 taken along the reference lines 4—4 thereof.

In FIG. 1, the example of the vacuum stroke cleaning implement 10 illustrated includes a molded body 12 having an elongated cylindrical portion 14 open at the rear 16 thereof and being terminated at its forward end 18 by a radially inwardly extending, tip retaining flange 20. A cocking finger grip 22 extends upwardly from the forward portion of the body 12 and a piston stop guide extends upwardly from the rear portion of the body 12. That portion of the piston stop mechanism molded with the body 12 consists, in this example, of an opening 24 in the top wall of the rear portion of the cylindrical surface 14 and a guide channel 26 formed by the outer surface 28 of the body 12, and a U-shaped, in cross section, short channel element 30 molded thereover (see FIG. 4). The side walls 32 of the U-shaped channel may extend forwardly, as shown, to provide a guard about the opening 24.

Figure 3:
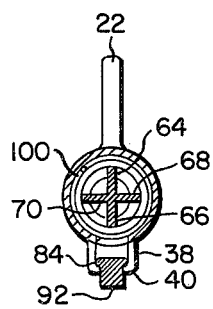
FIG. 3 is a cross-sectional view of the structure shown in FIG. 1 taken along the reference lines 3—3 thereof.

A somewhat similar, but open, trigger and cocking lever guide channel 34 extends downwardly along a major portion of the length of the body 12. Within the channel 34, an elongated slot 36, open to the rear, is formed in the cylindrical wall 14 of the body 12. This slot permits the axial passage of the cocking handle carried by the piston as shown infra. The forward portion of the channel 34 retains and axially guides the trigger portion of piston assembly also described infra. The channel is formed by a pair of symmetrically juxtaposed side rail elements 38 each having a retaining lip 40 (see FIG. 3) along its length to form a composite, retaining guideway 42.

The molded piston assembly 44 includes, in this example, a circular piston element 46 which may be formed to provide an O-ring 48 retaining groove 50. A tip cleaning rod 52 extends forwardly of the piston element. A circular guide boss element 54 is disposed at the rear of the piston assembly 44 and, like the piston element 46, is guided by the cylindrical surface 14 to move axially along the length thereof. The guide boss 54, the piston element 46, and the cleaning rod 52 are all interconnected and supported by a molded cruciform arrangement of relatively thin web elements 56, 58, 60, 62 and 64, 66, 68, 70, respectively (see FIG. 3). Affixed to the rear of the piston element 46 and connected at 72 to the web element 56 is a piston stop element 74 which is molded in a manner to be spring biased outwardly against the cylindrical surface 14. Accordingly, when the piston assembly 44 is disposed rearwardly, as at the end of its vacuum stroke, the stop element 74 is urged outwardly through the opening 24 and into the guide channel 26. The angled end 76 of the stop element provides a guided entrance for the element into the guide channel. A tab element 78 disposed on the bottom of the stop element 74 engages the rearward end of the opening 24 and in cooperation therewith provides a positive stop for the rearward travel of the piston assembly. When the operator depresses the stop element 74 inwardly, as by introducing a pencil tip or the like through the opening 24, the stop element remains radially within the cylindrical surface 14 and permits the entire piston assembly to be withdrawn rearwardly from the body 12.

Figure 2:
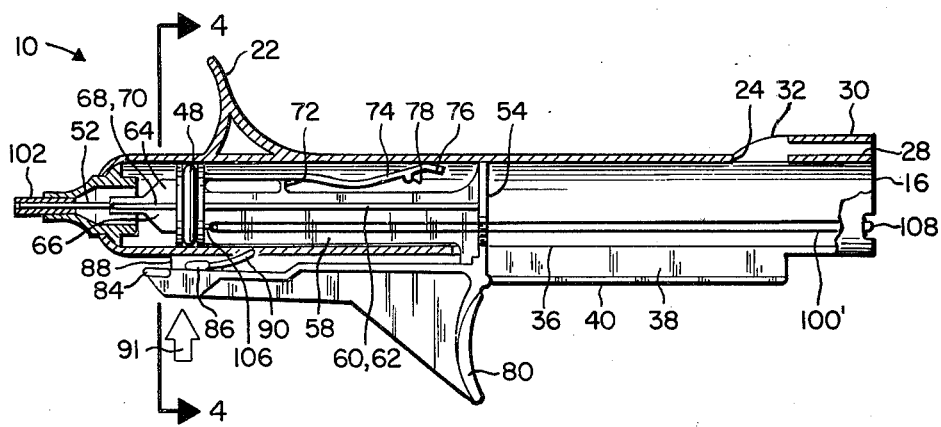
FIG. 2 is a similar view illustrating an alternative example of the implement in a cocked, or loaded configuration.

A cocking lever 80 is affixed to the lower portion of the rear, circular guide element 54, and extends radially outwardly through the slot 36 for access by the operator, the length of the access slot forwardly being sufficient to permit the full forward cocking action of the piston assembly, as indicated in the configuration shown in FIG. 2.

A trigger, guide portion 82 is carried by the cocking lever 80 and extends forwardly therefrom along and within the guide channel 34. The trigger guide portion is sufficiently thin to pass between the retaining lip ridges 40 (see FIGS. 3 and 4) except for a pair of guide blocks 84, 86 molded integrally with the trigger, guide portion 82. The forward guide block 84 constitutes a trigger latch in combination with the forward end 88 of the guide channel 34. The forward portion of the trigger, guide portion is urged radially outwardly, downwardly in FIG. 2, by a molded leaf trigger spring 90 which bears against the outer cylindrical surface of the body 12 between the juxtaposed guide rail elements 38. Consequently, when the piston assembly is cocked fully forwardly, the guide block 84 moves abruptly outwardly until the guide block 86 engages the retaining ridges 40 and precludes further outward displacement. In this configuration, the piston is cocked forwardly until released by pressing, with the operator's finger tip at 91, the forward tip 92 of the trigger, guide inwardly against the action of the trigger leaf spring 90 whereupon the piston assembly is effectively triggered to permit a fly-back, or vacuum, stroke.

A molded tip element 94 is shown having a short cylindrical surface 96 which is substantially equal to the diameter of the forward opening of the body 12. An enlarged diameter flange portion 98 engages the tip retaining flange 20 of the body 12 and is shown, in FIG.

1, urged thereagainst by a helical compression, cocking spring 100, the spring 100 being axially compressively retained between the tip element 94 and the piston element 46. A heat resistant, teflon nozzle element 102 is shown retained in a press-fit relationship within the tip element 94.

To assemble the implement 10 shown in FIG. 1, the nozzle element 102 is emplaced within the tip element 94 and the subassembly placed within the body 12 through the open rear portion 16 thereof. The spring 100 is then placed loosely behind it; and the piston assembly 44 inserted behind it. Once the piston assembly is pushed axially forward to the extent that rear tip 76 of the stop element 74 pops upwardly through the opening 24, the entire implement is fully assembled and ready for use.

In the example of FIG. 2, a tension spring which may be metal or molded of plastic or may, as shown in the instant example, be a simple elastic band 100' affixed in tension between a hook member 106 disposed on the rear of the piston element 46 and a retaining slot 108 formed in the rear edge of the body 12. The band may pass through the guide boss 54 as indicated. In this example the main spring elastic band 100' may be a common rubber band the length of which is selected to provide enough tension to remain hooked in place at the end of the fly-back stroke. The "spring constant" or strength of the rubber band is selected to provide an optimum desire vacuum stroke fly-back action of the piston.

In operation of either example, the operator grasps the cocking lever 80 and cocking finger grip 22 with the thumb and first or second finger of one hand and cocks the implement by forcing the piston assembly forwardly against the force of the cocking spring 100, or 100', until the forward guide block 84 pops radially outwardly to be engaged by the forward end 88 of the trigger guide channel.

There has thus been disclosed and described an example of a miniature vacuum stroke cleaning implement which exhibits the advantages and achieves the objects set forth hereinabove.

I claim

1. A solder removing implement comprising:
   a molded body having a cylinder, air pump portion and forward and rearward ends, said rearward end being substantially open;
   a guide channel carried by said body and disposed along said cylindrical portion externally thereof, said body being formed to define a guide slot aligned with said guide channel and extending from said rearward end forwardly for a predetermined length along said cylinder portion;
   tip means carried by said body contiguously to its said forward end and forming a nozzle for air flow communication between the external environment and said cylinder portion;
   a molded piston assembly carried by said body and including integrally;
      a piston element disposed axially slidably within said cylinder portion of said body in air pump relation therewith,
      a cleaning rod element extending forwardly of said piston element for cleaning said nozzle when said piston assembly is displaced forwardly toward said forward end of said body,
      a circular guide boss element disposed axially slidably in said cylinder portion and spaced axially rearwardly from said piston element,
      a cocking handle portion for urging said piston assembly forwardly in said cylinder portion and extending radially from said guide boss element externally of said body and disposed axially slidably in said guide slot,
      a guide trigger tongue element extending forwardly from said cocking handle portion and disposed slidably, laterally and radially captively, within said guide channel means of said body,
      first trigger-latching means carried by said tongue element and disposed contiguously to the forward end thereof;
   second trigger-latching means carried by said body and disposed contiguously to the forward end of said guide channel thereof,
   said first and second trigger-latching means being of the character cooperatively to engage and latch said piston assembly forwardly in said cylinder portion of said body when urged to such disposition by operation of said cocking handle portion of said piston assembly,
   said first and second trigger-latching means being further of the character to be selectively disengaged to permit, when desired, rearward displacement of said piston assembly;
   energy storage means carried within said body and connected between said piston assembly and said body and against which work is done when said piston assembly is urged forwardly by said operation of said cocking handle portion and which causes a rapid, vacuum stroke flyback of said piston assembly when said trigger-latching means are disengaged; and
   piston assembly stop means carried by said body and disposed contiguously to the rear thereof for normally engaging said piston assembly and limiting its rearward displacement along said cylinder portion of said body and including stop means control element for selectively disengaging said piston assembly to permit, when desired, the removal rearwardly of said piston assembly from said body.

2. The invention according to claim 1 in which said forward end of said body forms an opening of a tip receiving reduced diameter and in which said tip means includes a tip element having:
   a mid portion of a first diameter approximately equal to said reduced diameter of said forward end of said body and
   a rear enlarged diameter portion for engaging said tip receiving reduced diameter forward end of said body internally thereof for retaining said tip element thereby.

3. The invention according to claim 2 in which said energy storage means comprises a compression spring disposed within said cylinder portion axially compressively between said tip element and said piston.

4. The invention according to claim 1 in which said energy storage means comprises a tension spring connected between said rear end of said molded body and said piston assembly.

5. The invention according to claim 1 in which said guide channel means includes, along its length, tongue element retaining means terminating at a predetermined point near said forward end of said body for limiting the radially outward displacement of said forward end of said tongue element, the invention further including spring means carried by said tongue element for urging said forward end thereof radially outwardly against said tongue element retaining means of said guide channel means, the forwardly extending length of said tongue element being effectively greater than that of said guide channel means whereby when said piston assembly is displaced fully forwardly by operation of said cocking handle portion, said first trigger latching means, carried by said forward end of said tongue element, extends forwardly of said predetermined point on said body where said tongue element retaining means terminates, whereby said first trigger-latching means is permitted to be urged further outwardly by action of said tongue element spring means for engaging said second trigger-latching means, said first trigger-latching means being selectively manually urgeable inwardly against the action of said tongue element spring means for releasing said piston assembly and permitting its said fly-back stroke.

6. The invention according to claim 5 in which said forward end of said body forms an opening of a tip receiving reduced diameter and in which said tip means includes a tip element having:
   a mid portion of a first diameter approximately equal to said reduced diameter of said forward end of said body and
   a rear enlarged diameter portion for engaging said tip receiving reduced diameter forward end of said body internally thereof for retaining said tip element thereby.

7. The invention according to claim 6 in which said energy storage means comprises a compression spring disposed within said cylinder portion axially compressively between said tip element and said piston.

8. The invention according to claim 5 in which said energy storage means comprises a tension spring connected between said rear end of said molded body and said piston assembly.

* * * * *